United States Patent
Augier et al.

(10) Patent No.: US 10,065,166 B2
(45) Date of Patent: Sep. 4, 2018

(54) MIXING AND DISTRIBUTION DEVICE WITH MIXING AND EXCHANGE ZONES AND DEFLECTORS

(71) Applicant: IFP Energies Nouvelles, Rueil-Malmaison (FR)

(72) Inventors: Frederic Augier, Saint Symphorien D'Ozon (FR); Cecile Plais, Les Haies (FR); Philippe Beard, Saint Genis-Laval (FR); Jerome Bonnardot, Fontenay le Fleury (FR); Jauffray Delteil, Moisselles (FR); Paris Packeu, Meudon (FR); Nicolas Pupat, Houilles (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 15/499,965

(22) Filed: Apr. 28, 2017

(65) Prior Publication Data
US 2017/0312720 A1 Nov. 2, 2017

(30) Foreign Application Priority Data
Apr. 29, 2016 (FR) ...................................... 16 53857

(51) Int. Cl.
*B01J 8/00* (2006.01)
*B01J 8/02* (2006.01)
(Continued)

(52) U.S. Cl.
CPC ............... *B01J 8/0492* (2013.01); *B01F 3/04* (2013.01); *B01F 5/0606* (2013.01);
(Continued)

(58) Field of Classification Search
CPC ...... B01F 3/00; B01F 3/04; B01F 5/00; B01F 5/06; B01F 5/0601; B01F 5/0603;
(Continued)

(56) References Cited

U.S. PATENT DOCUMENTS 8,181,942 B2 * 5/2012 Sechrist ................. B01J 8/0492
239/124
8,337,787 B2 12/2012 Augier et al.
(Continued)

FOREIGN PATENT DOCUMENTS

| FR | 2952835 A1 | 5/2011 |
| FR | 3034323 A1 | 10/2016 |
| WO | 2014/210276 A1 | 12/2014 |

OTHER PUBLICATIONS

Search Report dated Jan. 4, 2017 issued in corresponding FR 1653857 application (2 pages).

*Primary Examiner* — Natasha E Young
(74) *Attorney, Agent, or Firm* — Millen, White, Zelano and Branigan, P.C.

(57) ABSTRACT

A fluid mixing and distribution device for a catalytic down-flow reactor, said device comprising a collection zone (A), a mixing zone (B) comprising a mixing chamber (15) for fluids and an exchange chamber (16) for fluids, a distribution zone (C), said exchange chamber (16) comprising at least one upper lateral cross-section of flow (17a) and at least one lower lateral cross-section of flow (17b) through which fluids can pass from said exchange chamber (16) to said distribution zone (C), characterized in that said exchange chamber (16) comprises a fluid deflection means (24) fixed to said exchange chamber (16) and located downstream of the upper lateral cross-section of flow (17a), said fluid deflection means (24) forming with said exchange chamber (16) a space (26) in the shape of a pan.

15 Claims, 4 Drawing Sheets

(51) Int. Cl.
  *B01J 8/04* (2006.01)
  *B01F 3/00* (2006.01)
  *B01F 3/04* (2006.01)
  *B01F 5/00* (2006.01)
  *B01F 5/06* (2006.01)

(52) U.S. Cl.
  CPC .......... *B01F 5/0609* (2013.01); *B01F 5/0688* (2013.01); *B01J 8/0453* (2013.01); *B01J 8/0496* (2013.01); *B01F 2215/0036* (2013.01); *B01J 2208/00362* (2013.01); *B01J 2208/00849* (2013.01); *B01J 2208/00938* (2013.01); *B01J 2208/027* (2013.01)

(58) Field of Classification Search
  CPC .... B01F 5/0605; B01F 5/0606; B01F 5/0609; B01F 5/0682; B01F 5/0687; B01F 5/0688; B01F 2215/00; B01F 2215/0001; B01F 2215/0036; B01J 8/00; B01J 8/02; B01J 8/04; B01J 8/0446–8/0453; B01J 8/0492; B01J 8/0496; B01J 2208/00–2208/00017; B01J 2208/00327; B01J 2208/00336; B01J 2208/00353; B01J 2208/00362; B01J 2208/00796; B01J 2208/00823; B01J 2208/00831; B01J 2208/00849; B01J 2208/00938; B01J 2208/02; B01J 2208/024; B01J 2208/027

See application file for complete search history.

(56) References Cited

U.S. PATENT DOCUMENTS

2011/0123410 A1    5/2011    Augier et al.
2016/0288073 A1   10/2016    Beard et al.

* cited by examiner

MIXING AND DISTRIBUTION DEVICE WITH MIXING AND EXCHANGE ZONES AND DEFLECTORS

This application claims priority to French Patent Application No. FR 1653857, filed on Apr. 29, 2016, which is hereby expressly incorporated by reference in its entirety.

FIELD OF THE INVENTION

The present invention relates to the field of exothermic reactions, and more particularly to hydrotreatment, hydrodesulphurization, hydrodenitrogenation, hydrocracking, hydrogenation, hydrodeoxygenation, hydroisomerization, hydrodewaxing or in fact hydrodearomatization reactions carried out in a fixed bed reactor. More particularly, the invention relates to a device for mixing and distributing fluids in a co-current downflow reactor and to its use in carrying out exothermic reactions.

PRIOR ART

Exothermic reactions carried out in refining and/or petrochemistry, for example, have to be cooled with an additional fluid, termed the quench fluid, in order to avoid thermal runaway of the catalytic reactor in which they are carried out. The catalytic reactors used for such reactions generally comprise at least one bed of solid catalyst. The exothermic nature of the reactions means that a homogeneous temperature gradient has to be preserved in the interior of the reactor in order to prevent the occurrence of hot spots in the bed of catalyst in the reactor. Zones which are too hot can prematurely reduce the activity of the catalyst and/or lead to non-selective reactions and/or lead to thermal runaway. Thus, it is important to provide at least one mixing chamber in a reactor located between two beds of catalyst which can be used to provide a homogeneous fluid temperature distribution over a section of the reactor and cooling of the process fluids to a desired temperature.

In order to carry out this homogenization, the person skilled in the art is frequently obliged to use a specific arrangement of contact means which are often complicated, including introducing quench fluid into the section of the reactor in as homogeneous a manner as possible. As an example, the document FR 2 824 495 A1 describes a quench device which can ensure efficient exchange between the quench fluid or fluids and the process fluid or fluids. That device is integrated into a chamber and comprises a rod for injection of the quench fluid, a fluid collection baffle, the quench box itself, carrying out the mixing between the quench fluid and the downflow, and a distribution system composed of a perforated pan and a distributor plate. The quench box comprises a deflector which provides the fluids with a vortex motion in a direction which is substantially non-radial and not parallel to the axis of said chamber downstream of the deflector, in the direction of movement of the process fluid, at least one outlet cross-section of flow for the mixture of fluids formed in the box. That device can be used to overcome certain disadvantages of the various prior art systems, but it is still bulky.

In order to overcome the problem of bulk, a device for mixing fluids in a downflow reactor was developed and has been described in the document FR 2 952 835 A1. That device comprises a horizontal collection means provided with a vertical collection conduit to receive the fluids, an injection means placed in the collection conduit, and an annular mixing chamber with a circular section located downstream of the collection means in the direction of fluid movement. The mixing chamber comprises an inlet end connected to the collection conduit and an outlet end to allow the fluids to pass through, as well as a horizontal pre-distributor plate comprising at least one riser. The advantage of that device is that it is more compact than that described above, and can be used to provide good mixing of the fluids and good homogeneity of temperature.

With the aim of reducing the bulk of the mixing and distribution device still further, another solution proposed in French application no. 15/52783 is to produce a fluid mixing and distribution device in which the mixing zone and the distribution zone for the fluids are located at the same level. A device of that type is shown in FIGS. 1a to 1c and will be described in more detail below.

However, a device of that type may suffer from certain disadvantages when the level of the liquid phase in the distribution zone of the device is high, as it can partially obstruct the lateral cross-sections of flow through which the gas phase can pass from the mixing zone to the distribution zone, which causes poor flow of said gas phase towards the distribution zone, and thus causes an imbalance as regards the homogeneous distribution of the fluids over the bed of catalyst generally located below said device. One aim of the invention is to propose an improvement to the fluid mixing and distribution device described in French application no. 15/52783 which could overcome the disadvantages mentioned above while remaining low in bulk and allowing for good fluid mixing and distribution efficiency.

AIMS OF THE INVENTION

The present invention concerns a device for mixing and distributing fluids for a catalytic downflow reactor, said device comprising:
- at least one collection zone (A) comprising at least one collection means;
- at least one substantially vertical collection conduit which is capable of receiving a process fluid collected by said collection means and at least one injection means opening into said collection conduit in order to inject a quench fluid;
- at least one mixing zone (B) located downstream of said collection conduit in the direction of fluid movement and in communication with said collection conduit, said mixing zone (B) comprising at least one fluid mixing chamber;
- at least one distribution zone (C), located downstream of said mixing zone (B) in the direction of fluid movement, comprising a distributor plate supporting a plurality of risers;

said mixing zone (B) being located at the same level as the distribution zone (C) and further comprising at least one fluid exchange chamber connected to and in communication with said mixing chamber, said exchange chamber comprising at least one upper lateral cross-section of flow and at least one lower lateral cross-section of flow for the passage of fluids from said exchange chamber to said distribution zone (C), characterized in that said exchange chamber further comprises a means for deflecting fluids fixed on said exchange chamber and located downstream of at least one upper lateral cross-section of flow in the direction of fluid movement, said fluid deflection means forming a space with said exchange chamber which is in the form of a pan.

Preferably, said mixing chamber is located above said exchange chamber.

Advantageously, the upper end of said fluid deflection means is located above the last level of lateral orifices of said risers with respect to the distributor plate.

Preferably, the upper end of said fluid deflection means is also located below the upper end of said risers.

Advantageously, the upper end of said fluid deflection means is located at the same level as the upper end of said risers.

Advantageously, said fluid deflection means comprises at least one orifice through which a liquid phase can pass in the direction of the distributor plate.

Advantageously, each upper lateral cross-section of flow of said exchange box is associated with a fluid deflection means.

Preferably, the total cumulative height H2 of said mixing chamber and of said exchange chamber is in the range 200 to 1500 mm.

Advantageously, the width L of said exchange chamber is in the range 200 to 1100 mm.

Preferably, the volume ratio between said exchange chamber and said mixing chamber is in the range 5% to 60%.

Advantageously, said mixing chamber and said exchange chamber are in one piece.

Preferably, said mixing chamber comprises at least one diverting means on at least one or more internal wall(s) of said mixing chamber.

Advantageously, said exchange chamber comprises a plurality of horizontal cross-sections of flow for fluids to pass from said exchange zone to the distributor plate.

Preferably, the exchange chamber is located at a distance "d" from the distributor plate which is in the range 20 to 150 mm.

In another aspect, the invention concerns a catalytic downflow reactor comprising a chamber comprising at least two fixed beds of catalyst separated by an intermediate zone comprising a fluid mixing and distribution device in accordance with the invention.

BRIEF DESCRIPTION OF THE DRAWINGS

FIG. 1c is a perspective view of the mixing zone (B) of the device in accordance with FIG. 1a.

DETAILED DESCRIPTION OF THE INVENTION

The compact mixing and distribution device in accordance with the invention is used in a reactor in which exothermic reactions are carried out, such as hydrotreatment, hydrodesulphurization, hydrodenitrogenation, hydrocracking, hydrogenation, hydrodeoxygenation, hydroisomerization, hydrodewaxing or indeed hydrodenitrogenation reactions. In general, the reactor is elongate in shape along a substantially vertical axis. At least one process fluid is moved from top to bottom of said reactor through at least one fixed bed of catalyst. Advantageously, at the outlet from each bed with the exception of the last bed, the process fluid is collected then mixed with a quench fluid in said device before being distributed to the bed of catalyst located downstream of a distributor plate. "Downstream" and "upstream" are defined with respect to the direction of flow of the process fluid. The process fluid may be a gas or a liquid or a mixture containing liquid and gas; this depends on the type of reaction being carried out in the reactor.

Figure 1A:
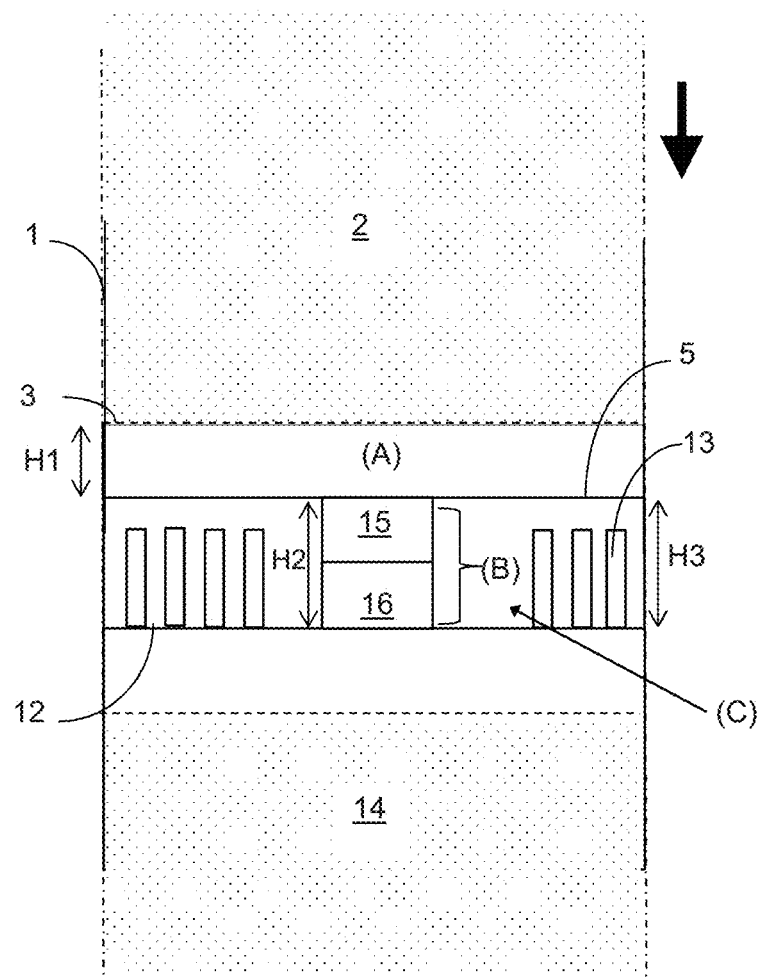
FIG. 1a represents an axial section of a catalytic downflow reactor comprising at least two beds of solid catalyst, and comprising a compact fluid mixing and distribution device as described in French application no. 15/52783.
Figure 1B:
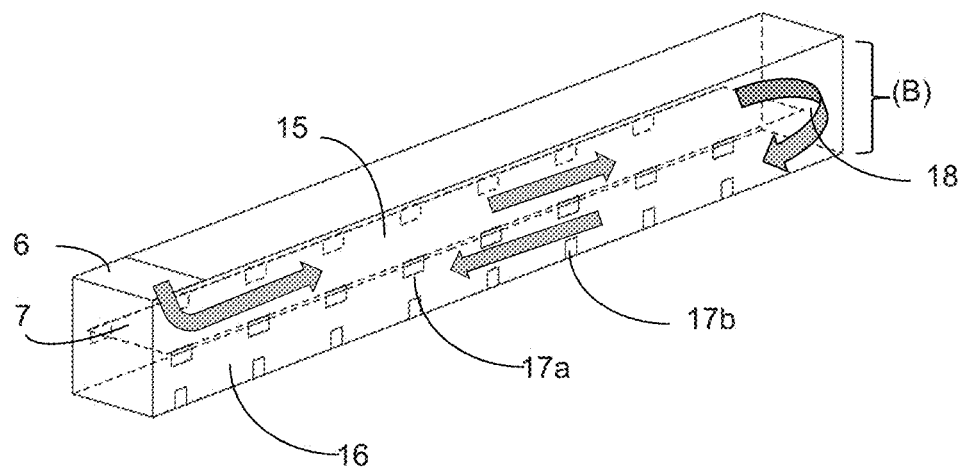
FIG. 1b respectively represents a detailed view of the mixing zone (B) of the device in accordance with FIG. 1a (the dashed lines represent parts of the mixing zone which are not visible, i.e. are inside said zone).
Figure 1C:
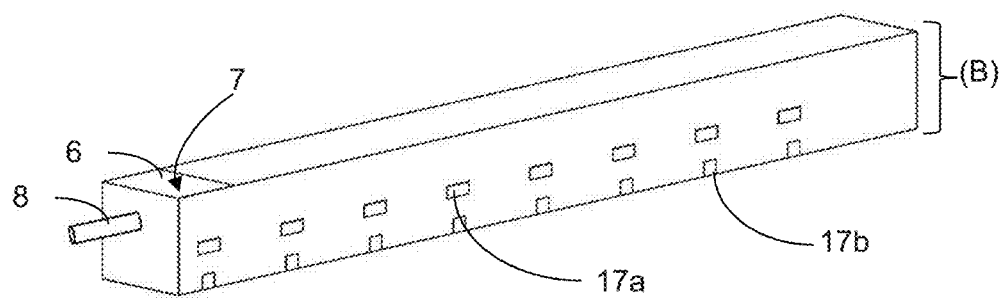

Referring to FIGS. 1a to 1c, the mixing and distribution device in accordance with the prior art may be disposed in a reactor 1 with an elongate shape along a substantially vertical axis in which at least one process fluid flows from top to bottom through at least one bed of catalyst 2. The device is disposed below the bed of catalyst 2 with respect to the flow of process fluid in the chamber 1. A support screen 3 can support the bed of catalyst 2 in a manner such as to isolate a collection zone (A) disposed below the bed of catalyst 2. The collection zone (A) is necessary in order to allow drainage of the process fluid to a collection conduit 7 (see FIGS. 1b and 1c). The process fluid which is flowing is, for example, composed of a gas phase and a liquid phase. The process fluid passing through the bed of catalyst 2 is collected via a substantially horizontal collection means 5 (also known as a collection baffle) leading to a substantially vertical collection conduit 7 disposed either below the collection zone (A) at the level of a zone termed the mixing zone (B) (as can be seen in FIGS. 1b and 1c), or at the level of the collection zone (A) (not shown in the figures). The terms "substantially vertical" and "substantially horizontal" as used in the present invention mean a variation from a vertical or horizontal plane by an angle α in the range ±5 degrees. The collection means 5 (see FIG. 1a) is constituted by a solid plate disposed in the plane perpendicular to the longitudinal axis of the chamber below the support screen 3 of the bed of catalyst 2. The plate of the collection means 5 extends radially over the whole surface of the reactor 1. It comprises an opening 6 (see FIGS. 1b and 1c) at one of its ends to which said collection conduit 7 is connected. The collection means 5 can be used to collect the flow of process fluid from the upstream catalytic bed 2 and direct it towards said collection conduit 7. The collection means 5 is separated from the support screen 3 of the bed of catalyst 2 by a height H1 (FIG. 1a). The height H1 is selected in a manner such as to limit the pressure drop during collection of fluid flowing from the bed of catalyst 2 and to limit the trap height, i.e. the height formed by the liquid accumulated in the collection means 5. The trap height does not modify the drainage of the process fluid towards the collection conduit 7, nor does it modify its flow in this conduit, nor does it modify its flow through the upper catalytic bed 2. When the collection conduit 7 and the injection means 8 (FIG. 1c) are located at the level of the mixing zone (B), the height H1 is in the range 10 to 500 mm, preferably in the range 10 to 200 mm, more preferably in the range 30 to 150 mm, yet more preferably in the range 40 to 100 mm. Thus, in the collection zone (A), the process fluid obtained from bed 2 is constrained to pass through the collection conduit 7. When the collection conduit 7 and the injection means 8 are located at the level of the collection zone (A), the height H1 is in the range 10 to 400 mm, preferably in the range 30 to 300 mm, and yet more preferably in the range 50 to 250 mm.

Below the collection zone (A) is a mixing zone (B) and a distribution zone (C). Referring now to FIGS. 1b and 1c, the mixing zone (B) comprises a substantially vertical collection conduit 7 which can receive the process fluid collected by the collection means 5 and the quench fluid from the injection means 8 (see FIG. 1c) opening into said collection conduit 7.

The mixing zone (B) further comprises a mixing chamber 15 (see FIGS. 1a and 1b) located downstream of the collection means 5 in the direction of fluid movement. The collection conduit 7, which is in communication with the mixing chamber 15, may be located above the mixing chamber 15 or at the same level as said chamber. Preferably, the collection conduit 7 is located at the same level as the mixing chamber 15 (see FIG. 1b in particular). Similarly, the injection conduit 8 may open above the mixing chamber 15, at the same level as said chamber, or directly into said mixing chamber 15 by means of a device known to the person skilled in the art, for example a perforated tube passing through the mixing zone 15. The quench fluid may be injected as a co-current, a cross-current, or even as a counter-current with respect to the process fluid from the collection zone (A).

The distribution zone (C) itself comprises a distributor plate 12 supporting a plurality of risers 13. The distribution zone (C), extending over a height H3 (see FIG. 1a), comprises a distributor plate 12 (also known here as a distribution plate or distributor tray) and a plurality of risers 13. More precisely, the risers 13 are open at their upper end via an upper opening and along their lateral wall they have a series of lateral orifices 21 for the separate passage of the liquid phase (via the orifices) and the gas phase (via the upper opening) into the risers 13, in order to carry out intimate mixing thereof inside said risers 13. The shape of the lateral orifices 21 may vary widely, generally circular or rectangular, these orifices preferably being distributed over each of the risers at a plurality of levels which are substantially identical from one riser to another, generally at least one level, and preferably 1 to 10 levels, in order to produce an interface which is as regular as possible between the gas phase and the liquid phase.

A major characteristic of the prior art device resides in positioning the mixing zone (B) at the same level as the distribution zone (C), and in that said mixing zone (B) is constituted by a mixing chamber 15 for fluids connected to and in communication with an exchange chamber 16 for fluids (see FIGS. 1a and 1b), the exchange chamber 16 being located downstream of the mixing chamber 15 in the direction of fluid movement. The term "mixing chamber 15" means the space in which mixing between the process fluid and the quench fluid is carried out. The term "exchange chamber 16" means the space in which the mixed process fluid and quench fluid are in direct contact with the distribution zone (C) via the upper lateral cross-section of flow 17a and the lower lateral cross-section of flow 17b.

The configuration of the mixing zone (B) means that the fluids in the mixing chamber 15 can mix and said mixture can flow towards the exchange chamber 16. Mixing between the process fluid and the quench fluid continues to occur at the level of the exchange chamber 16. Referring now to FIGS. 1b and 1c, the exchange chamber 16 comprises at least one upper lateral cross-section of flow 17a and at least one lower lateral cross-section of flow 17b for the passage of fluids from the mixing zone (B) to the distribution zone (C). Preferably, the mixing chamber 16 comprises at least two upper 17a and lower 17b lateral cross-sections of flow. Thus, only the exchange chamber 16 is in direct contact with the distribution zone (C). The upper lateral cross-sections of flow 17a in particular are used to pass gas from the exchange chamber 16 to the distribution zone (C) and the lower lateral cross-sections of flow 17b can in particular be used to pass liquid from the exchange chamber 16 to the distribution zone (C).

The mixing chamber 15 may also be located below said exchange chamber 16 (not shown in the figures). At least one opening 18 (see FIG. 1b) is provided in the mixing zone (B) in order to allow the mixture of fluids to pass from the mixing chamber 15 to the exchange chamber 16. The mixing chamber 15 may be located above said exchange chamber 16 (as shown in FIGS. 1a, 1b and 1c).

However, a device of this type may suffer from certain disadvantages when the level of the liquid phase in the distribution zone of the device is such that it partially or even completely covers the upper lateral cross-sections of flow 17a of the exchange chamber 16 which in particular are for the passage of the gas phase from the mixing zone (B) towards the distribution zone (C), which could cause an imbalance as regards the distribution of fluids (gas and liquid) in the distribution zone (C) and therefore cause a non-homogenous distribution of the fluids over the bed of catalyst 14 located downstream of the mixing zone (C) in the direction of fluid movement.

The Applicant has developed an improvement to the fluid mixing and distribution device in accordance with the prior art in order to overcome the disadvantages mentioned above, without in any way modifying the bulk of said device, by inserting at least one fluid deflection means 24 at the level of the exchange chamber 16 of the distribution zone (B), downstream of at least one upper lateral cross-section of flow 17a in the direction of fluid movement. The arrangement of the fluid deflection means 24 over the exchange chamber 16 generates a space 26 in the form of an open pan over the distribution zone (C) which is open at the top, at the level of its upper portion (see FIG. 3).

Figure 2:
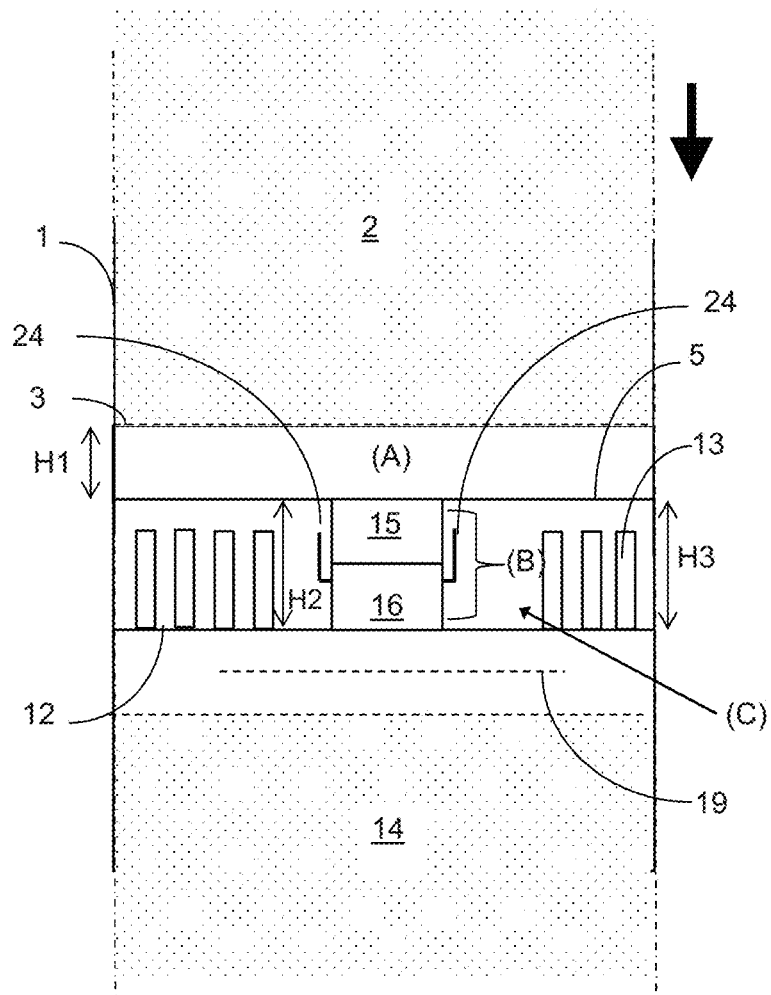
FIG. 2 represents an axial section of a catalytic downflow reactor comprising at least two beds of solid catalyst and comprising a compact fluid mixing and distribution device in accordance with the invention, this latter comprising means for deflecting fluids 24.

More particularly, referring now to FIG. 2, the fluid deflection means 24 is preferably fixed to the outside of the exchange chamber 16, i.e. downstream of the upper lateral cross-section of flow 17a in the direction of fluid movement. Said fluid deflection means 24 can be used to guide the gaseous fluid towards the upper portion of the distribution zone (C) so that this latter can enter into the interior of the risers 13 via their upper openings (not shown in the figures), and more particularly when the level of the liquid phase in the distribution zone (C) is such that it would completely or partially obstruct the lateral cross-sections of flow 17a of the exchange chamber 16 if such a deflection means 24 were not provided at the outlet from said upper lateral cross-sections of flow 17a. In fact, if the level of liquid phase in the distribution zone (C) is such that the gas/liquid interface 23 in said distribution zone (C) is located above the upper lateral cross-sections of flow 17a, the gaseous phase comprised in the exchange chamber 16 cannot pass through said lateral cross-sections of flow 17*a*, which prevents the formation of an intimate mixture between the gas phase and the liquid phase in the risers 13. In the same manner, if the level of the liquid phase in the distribution zone (C) is such that the gas/liquid interface 23 in said distribution zone (C) is at the level of the lateral cross-sections of flow 17*a*, the quantity of gas phase passing through the upper lateral cross-sections of flow 17*a* will be substantially lower than the quantity of gas phase which would normally pass through said sections in the case in which no liquid phase passed through the upper lateral cross-sections of flow 17*a*.

The deflection means 24 may have any shape as long as it generates, along with the exchange chamber 16 of the mixing zone (B), a space 26 in the form of a pan allowing the gas phase to flow towards the upper openings of the risers 13 and prevents partial or complete obstruction of the upper lateral cross-sections of flow 17*a* by the liquid phase comprised in the distribution zone (C).

Figure 3:
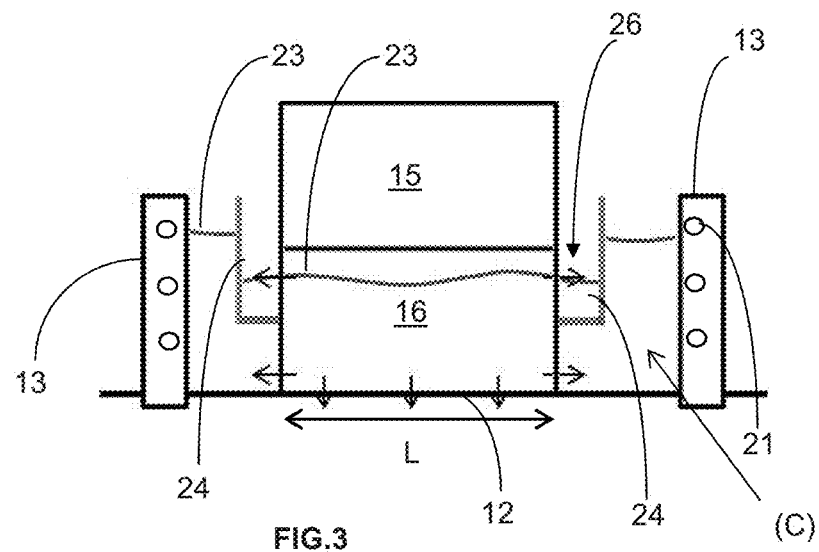
FIG. 3 is a sectional representation of a mixing and distribution device in accordance with the invention, the distributor plate 12 and the risers 13. The arrows represent the directions of flow of fluids from the exchange chamber to the distribution zone (C).
Figure 4:
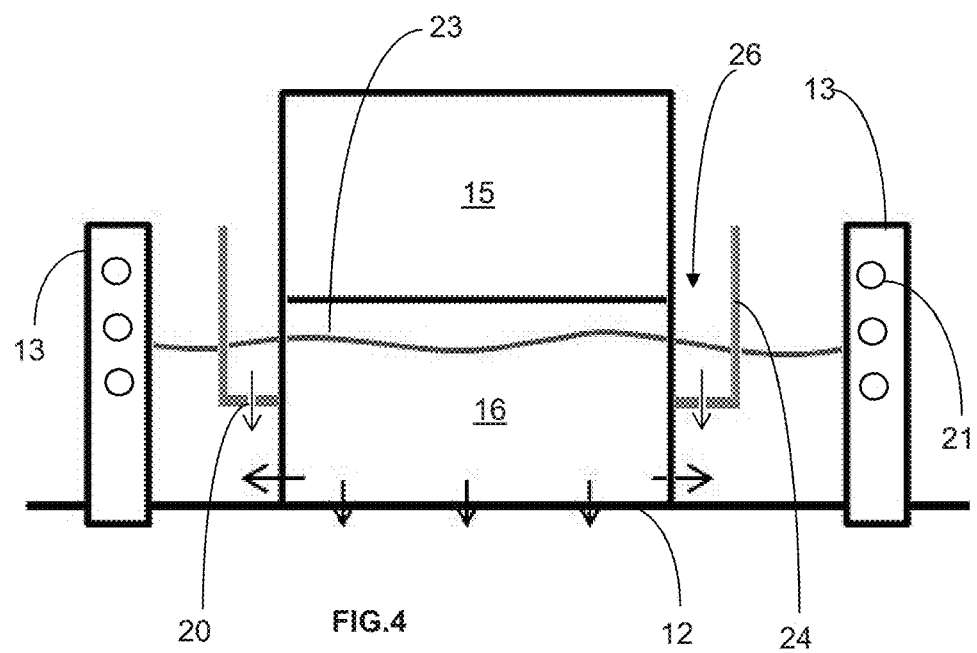
FIG. 4 is a representation of a particular embodiment of the device in accordance with the invention, in which the fluid deflection means 24 also comprise at least one orifice 20 for the liquid phase to pass through in the direction of the distributor plate 12.

Preferably, the upper end of said fluid deflection means 24 is located above the last level of the lateral orifices 21 of the risers 13 in order to prevent the liquid phase comprised in the distribution zone (C) from entering the space 26 (see FIGS. 3 and 4).

Preferably, the upper end of said fluid deflection means 24 is located at the same level or below the upper end of said risers 13, but at the same time is located above the last level of the lateral orifices 21 of said risers 13.

Figure 5:
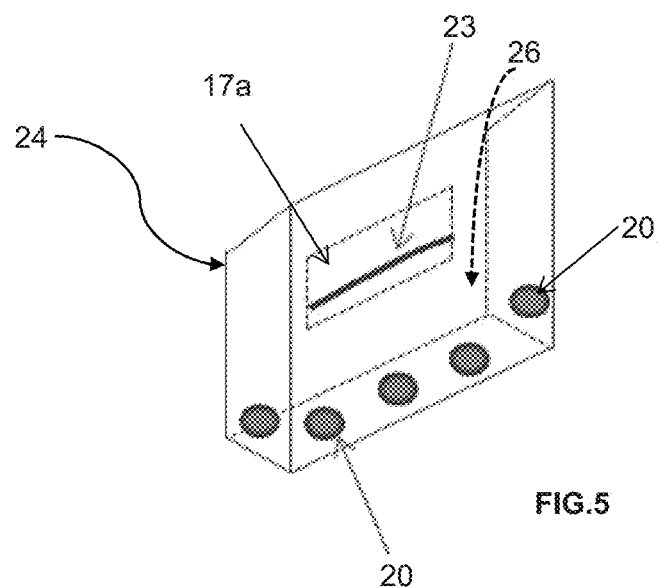
FIG. 5 is a perspective representation of a fluid deflection means 24 in a particular embodiment in accordance with the invention.

In accordance with a particular embodiment of the device in accordance with the invention, the fluid deflection means 24 further comprises at least one orifice 20 allowing the liquid phase which might be included in the space 26 to pass in the direction of the distributor plate 12 (see FIGS. 4 and 5). Thus, when at least a portion of the liquid phase included in the exchange chamber 16 is directed towards the distribution zone (C) by passing through the upper lateral cross-sections of flow 17*a*, this portion may be evacuated from the space 26 via the orifice 20. The number, shape and size of the orifices 20 may vary widely and are selected in a manner such as to allow an interface which is regular as possible to be established between the gas phase and the liquid phase.

In a particular embodiment in accordance with the invention, each upper lateral cross-section of flow 17*a* of the exchange chamber 16 comprises its own fluid deflection means 24.

In accordance with the invention, the section of the mixing chamber 15 and that of the exchange chamber 16 may be a section with four sides, preferably a trapezoidal section and more preferably a parallelogram section, or indeed a circular section. The term "trapezoidal section" means any section with four sides wherein two opposite sides of said section are parallel with each other. The term "parallelogram section" means any section with four sides wherein the opposite sides of said section are parallel to each other; as an example, the parallelogram section may be a rectangular section, a square section or a lozenge section. The term "circular section" means a section in the form of a circle or oval. Whatever the shape of the section of the mixing chamber 15 and the exchange chamber 16, the height or the diameter of said chambers will be selected in a manner such as to limit the pressure drop as far as possible and to limit the bulk in the reactor. Advantageously, the section of the mixing chamber 15 and that of the exchange chamber 16 is rectangular (see FIGS. 2 to 5). Apart from being more reliable mechanically, a rectangular section for the chambers means that they can be manufactured and part-assembled outside the reactor while still allowing them to then be easily inserted into the reactor.

The walls of the mixing chamber 15 and of the exchange chamber 16 may have any shape. The walls of the mixing chamber 15 and of the exchange chamber 16 may in particular extend in a straight direction (I-shaped) or be curved (C-shaped), or in fact they may be angled (L-shaped). The mixing zone (B) may be located at any position at the level of the distribution zone (C). As an example, the mixing zone (B) may be positioned at the centre of the distribution zone (C), or it may be offset from this latter position. Thus, the length of the mixing chamber and of the exchange chamber is determined by the person skilled in the art as a function of their position in the reactor chamber 1. Advantageously, the ends of the mixing chambers 15 and exchange chambers 16 are not in contact with the wall of the reactor chamber 1, so as to allow the movement of fluids over the distributor plate 12 either side of the mixing chamber 15 and exchange chamber 16. Advantageously, the mixing chamber 15 and the exchange chamber(s) 16 are in one piece.

The cumulative total height H2 of said mixing chamber 15 and of said exchange chamber 16 (see FIG. 2) is in the range 200 to 1500 mm, preferably in the range 200 to 800 mm, more preferably in the range 300 to 750 mm, and yet more preferably in the range 350 to 700 mm.

Preferably, the width "L" (see FIG. 3*a*) of the exchange chamber 16 is in the range 200 to 1100 mm, preferably in the range 200 to 800 mm, more preferably in the range 250 to 700 mm, and yet more preferably in the range 300 to 600 mm.

The volume ratio (as a %) between the exchange chamber(s) 16 and the mixing chamber 15 is in the range 5% to 60%, preferably in the range 10% to 60%, and yet more preferably in the range 15% to 40%.

In one embodiment of the invention, the exchange chamber 16 is placed directly on the distributor plate 12 (as can be seen in FIG. 2, for example). In another embodiment (not shown in the figures), the exchange chamber 16 is located at a distance "d" from said distributor plate 12, preferably in the range 20 to 150 mm, and more preferably in the range 30 to 80 mm. The space between the distributor plate 12 and the exchange chamber 16 allows fluids to be distributed over the entire surface of the distributor plate 12, and thus allows the distribution of the mixture of fluids over the entire section of the reactor above the bed of catalyst 14 located downstream of the mixing and distribution device in the direction of fluid movement to be homogenized. In this embodiment, in its lower portion, the exchange chamber 16 may comprise longitudinal cross-sections of flow so that the mixture of fluids can flow towards the distributor plate 12. Clearly, the number, shape and size of the longitudinal cross-sections of flow are selected in a manner such that a minor fraction of the flowing mixture of fluids passes through said longitudinal cross-sections of flow. The longitudinal cross-sections of flow may equally have the shape of orifices and/or slots.

Preferably, the mixing chamber 15 may comprise at least one diverting means (not shown in the figures) on at least one of the internal walls of said mixing chamber. The presence of at least one diverting means for the mixture of fluids passing through said mixing chamber 15 means that the surface area for exchange between the two phases can be increased, along with the heat transfer efficiency and matter transfer efficiency between the liquid and/or gas phases passing through said mixing chamber 15. Said diverting means may have a variety of geometric shapes in order to improve the efficiency of the mixing chamber, it being understood that said shapes can be used to divert, at least in part, the trajectory of the mixture of fluids passing through said exchange chamber 15. As an example, the diverting means may be in the form of a baffle, with a triangular, square, rectangular or oval shape or any other sectional shape. The diverting means may also be in the form of one or more ribs or in fact one or more fixed blade(s), or in fact a screen.

Below the distributor plate 12, a dispersion system may be positioned in a manner such as to distribute the fluids uniformly over the bed of catalyst 14 located downstream of said system. The dispersion system may comprise one or more dispersion devices 19 (see FIG. 2) which may be associated with each riser 13, or be common to a plurality of risers 13, or in fact be common to all of the risers 13 of the distributor plate 12. Each dispersion device 19 has a substantially flat and horizontal geometry, but it may have a perimeter of any shape. Further, each dispersion device 19 may be located at different heights. Advantageously, said dispersion device is in the form of screens and/or may optionally include deflectors. Advantageously, the axis of the screen or screens 19 is preferably perpendicular to the longitudinal axis of the reactor chamber in order to improve distribution of the mixture of fluids over the whole of the radial section of the reactor chamber. The distance separating the dispersion system from the bed of granular solids located immediately below it is selected in a manner such as to maintain the quality of mixing of the gaseous and liquid phases as far as possible to the quality it has when it leaves the risers 13.

Preferably, the distance between the distributor plate 12 and the bed of catalyst 14 located below said distributor plate is in the range 50 to 400 mm, preferably in the range 100 to 300 mm. The distance between the distributor plate 12 and said dispersion device 19 is in the range 0 to 400 mm, preferably in the range 0 to 300 mm. In a particular embodiment, the distributor plate 12 is placed on the dispersion device 19.

Compared with the devices described in the prior art, and more particularly compared with the device disclosed in French application no. 15/52783, the mixing and distribution device in accordance with the invention has the following advantages:
good compactness, because the mixing zone and the fluid distribution zone are integrated at the same height;
good thermal efficiency and good fluid mixing efficiency:
because of the flow of the mixture of fluids in a mixing zone comprising a mixing chamber, optionally comprising fluid diverting means, and one or more exchange chamber(s) located at the level of the distributor plate; and
because of the presence of fluid deflection means at the level of the upper lateral cross-section of flow of the exchange chamber, allowing the gas phase obtained from the exchange chamber to be guided towards the upper end of the risers of the distributor plate, as well as preventing the liquid phase comprised in the distribution zone from obstructing the upper cross-sections of flow of the exchange chamber.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding application No. FR 1653857, filed Apr. 29, 2016 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A device for mixing and distributing fluids for a catalytic downflow reactor, said device comprising:
at least one collection zone (A) comprising at least one collection means (5);
at least one substantially vertical collection conduit (7) which is capable of receiving a process fluid collected by said collection means (5) and at least one injection means (8) opening into said collection conduit (7) in order to inject a quench fluid;
at least one mixing zone (B) located downstream of said collection conduit (7) in the direction of fluid movement and in communication with said collection conduit (7), said mixing zone (B) comprising at least one fluid mixing chamber (15);
at least one distribution zone (C), located downstream of said mixing zone (B) in the direction of fluid movement, comprising a distributor plate (12) supporting a plurality of risers (13), which are open at their upper ends via an upper opening and which have a series of lateral orifices (21) along their lateral walls;
said mixing zone (B) being located at the same level as the distribution zone (C) and further comprising at least one fluid exchange chamber (16) connected to and in communication with said mixing chamber (15), said exchange chamber (16) comprising at least one upper lateral cross-section of flow (17a) and at least one lower lateral cross-section of flow (17b) for the passage of fluids from said exchange chamber (16) to said distribution zone (C), characterized in that said exchange chamber (16) further comprises a means for deflecting fluids (24) fixed on said exchange chamber (16) and located downstream of at least one upper lateral cross-section of flow (17a) in the direction of fluid movement, said fluid deflection means (24) forming a space (26) with said exchange chamber (16) which is in the form of a pan.

2. The device as claimed in claim 1, characterized in that said mixing chamber (15) is located above said exchange chamber (16).

3. The device as claimed in claim 1, characterized in that the upper end of said fluid deflection means (24) is located above the last level of lateral orifices (21) of said risers (13) with respect to the distributor plate (12).

4. The device as claimed in claim 3, characterized in that the upper end of said fluid deflection means (24) is also located below the upper end of said risers (13).

5. The device as claimed in claim 3, characterized in that the upper end of said fluid deflection means (24) is located at the same level as the upper end of said risers (13).

6. The device as claimed in claim 1, characterized in that said fluid deflection means (24) comprises at least one orifice (20) through which a liquid phase can pass in the direction of the distributor plate (12).

7. The device as claimed in claim 1, characterized in that each upper lateral cross-section of flow (17a) of said exchange box (16) is associated with a fluid deflection means (24).

8. The device as claimed in claim 1, characterized in that the total cumulative height H2 of said mixing chamber (15) and of said exchange chamber (16) is in the range 200 to 1500 mm.

9. The device as claimed in claim 1, characterized in that the width L of said exchange chamber (16) is in the range 200 to 1100 mm.

10. The device as claimed in claim 1, characterized in that the volume ratio between said exchange chamber (16) and said mixing chamber (15) is in the range 5% to 60%.

11. The device as claimed in claim 1, characterized in that said mixing chamber (15) and said exchange chamber (16) are in one piece.

12. The device as claimed in claim 1, characterized in that said mixing chamber (15) comprises at least one diverting means on at least one or more internal wall(s) of said mixing chamber (15).

13. The device as claimed in claim 1, characterized in that said exchange chamber (16) comprises a plurality of horizontal cross-sections of flow for fluids to pass from said exchange zone (16) to the distributor plate (12).

14. The device as claimed in claim 1, characterized in that the exchange chamber (16) is located at a distance "d" from the distributor plate (12) which is in the range 20 to 150 mm.

15. A catalytic downflow reactor comprising a chamber (1) comprising at least two fixed beds of catalyst (2, 14) separated by an intermediate zone comprising a fluid mixing and distribution device as claimed in claim 1.

* * * * *